United States Patent
Dawidowski et al.

(10) Patent No.: US 6,994,838 B2
(45) Date of Patent: Feb. 7, 2006

(54) PROCESS FOR THE PREPARATION OF LITHIUM ALUMINIUM HYDRIDE SOLUTIONS

(75) Inventors: Dirk Dawidowski, Frankfurt (DE); Bernhard Debbeler, Liebenburg (DE); Ute Emmel, Frankfurt am Main (DE); Walter Pleyer, Langelsheim (DE); Wilfried Weiss, Eschershausen (DE)

(73) Assignee: Chemetall GmbH, Frankfurt am Main (DE)

( * ) Notice: Subject to any disclaimer, the term of this patent is extended or adjusted under 35 U.S.C. 154(b) by 333 days.

(21) Appl. No.: 10/627,596

(22) Filed: Jul. 25, 2003

(65) Prior Publication Data

US 2004/0136900 A1    Jul. 15, 2004

(30) Foreign Application Priority Data

Aug. 16, 2002    (DE)    ................................. 102 37 441

(51) Int. Cl.
*C01B 6/24*    (2006.01)

(52) U.S. Cl. ..................................................... 423/644
(58) Field of Classification Search ................. 423/644
See application file for complete search history.

(56) References Cited

U.S. PATENT DOCUMENTS 5,730,952 A * 3/1998 Rathman et al. ............ 423/644
6,444,190 B2 * 9/2002 Pautard-Cooper et al. .. 423/644

\* cited by examiner

*Primary Examiner*—Wayne A. Langel
(74) *Attorney, Agent, or Firm*—Fulbright & Jaworski L.L.P.

(57) ABSTRACT

A process is described for the preparation of $LiAlH_4$ solutions, in which lithium hydride reacts with an aluminium halide in diethyl ether to give lithium aluminium hydride, the lithium halide which arises is separated off, and wherein a solvent the complexing energy of which with $LiAlH_4$ is greater than the complexing energy of diethyl ether with $LiAlH_4$ is then added, and the diethyl ether is removed by distillation.

9 Claims, No Drawings

PROCESS FOR THE PREPARATION OF LITHIUM ALUMINIUM HYDRIDE SOLUTIONS

The invention relates to a process for the preparation of lithium aluminium hydride solutions.

Lithium aluminium hydride (LiAlH$_4$) is manufactured industrially by reacting lithium hydride (LiH) with an aluminium halide (AlX$_3$) by the Schlesinger method (Finholt, A. F., Bond, A. C. and Schlesinger H. I. J., JACS, 69, 1199 (1947)):

$$4LiH + AlX_3 \rightarrow LiAlH_4 + 3LiX$$

X is here F, Cl, Br or I, with Cl being the most usual. Ethers are used as the solvent. Commercially available LiAlH$_4$ solutions generally contain no diethyl ether, because of the associated risk of explosion, but are manufactured as a 10% solution in THF or as a 15% solution in THF/toluene.

In order to obtain a solution of LiAlH$_4$ in THF, the synthesis may be carried out in THF. However, this has the disadvantage, on the one hand that the aluminium halides (preferably AlCl$_3$) utilised are poorly soluble in THF, and on the other hand that the lithium halides (preferably LiCl) which arise are relatively readily soluble in THF. This process thus exhibits a relatively low synthesis concentration and results in solutions having a relatively high halide impurity content.

For this reason solutions of LiAlH$_4$ in THF are prepared in such a way that the synthesis of LiAlH$_4$ is carried out first in diethyl ether. This has the advantage that the solubility of the aluminium halides (preferably AlCl$_3$) is relatively high in diethyl ether, while conversely the solubility of the lithium halides (preferably LiCl) which arise is relatively poor in diethyl ether. The LiAlH$_4$ solution in diethyl ether that is obtained is subsequently evaporated to dryness, and the solid LiAlH$_4$ powder is dissolved in the desired solvent (for example THF or THF/toluene). A disadvantage of this process is that the thermal loading of the LiAlH$_4$ during evaporation results in a partial decomposition:

$$3LiAlH_4 \rightarrow Li_3AlH_6 + 2AlH_3 (2AlH_3 \rightarrow 2Al + 3/2H_2)$$

A further disadvantage of this process is apparent in that a solid is first prepared from a solution in energy-intensive manner, and is then dissolved again.

The object of the invention is to provide a process for the preparation of diethyl-ether-free LiAlH$_4$ solutions, which eliminates the disadvantages of the prior art and in particular avoids the isolation and re-dissolution of LiAlH$_4$.

The object is achieved by a process for the preparation of LiAlH$_4$ solutions, in which lithium hydride reacts with an aluminium halide in diethyl ether to give lithium aluminium hydride, the lithium halide which arises is separated, and wherein a solvent the complexing energy of which with LiAlH$_4$ is greater than the complexing energy of diethyl ether with LiAlH$_4$ is then added, and the diethyl ether is removed by distillation.

Ethers such as, for example, tetrahydrofuran (THF), 2-methyltetrahydrofuran and ethers from the ethyl glycol ether group (such as, for example, monoglycol dimethyl ether, monoglycol diethyl ether, diglycol dimethyl ether, diglycol diethyl ether or diglycol dibutyl ether) may be utilised as preferred solvents. THF and 2-methyl-THF are particularly preferred. Amines, the complexing energy of which with LiAlH$_4$ is higher than the complexing energy of diethyl ether with LiAlH$_4$, may also be utilised. The complexing energies of intended solvents will optionally need to be determined in preliminary tests.

The process is preferably carried out in such a way that when the reaction of LiH with AlX$_3$ (X=preferably Cl) in diethyl ether has taken place the synthesis solution, at preferably from 50 to 70° C., particularly preferably 55 to 65° C., so much diethyl ether is distilled off that preferably an approx. 20% solution of LiAlH$_4$ in diethyl ether arises. The distillation of the diethyl ether is initially carried out at the boiling temperature of the diethyl ether. As the distillation proceeds further, the preferred temperatures are around 40 to 80° C., particularly preferably around 55 to 65° C. A vacuum is preferably applied during the distillation. The preferred 20% concentration solution obtained corresponds to a complex of one mole LiAlH$_4$ with 2 mole diethyl ether. The solvent is then added. At least a quantity of solvent equivalent to the remaining diethyl ether quantity (on a molar basis) is preferably added, particularly preferably from 2 to 5 molar equivalents. The diethyl ether released is distilled off. The distillation is preferably carried out with the application of a vacuum at preferred temperatures of from 40 to 80° C., particularly preferably 55 to 65° C. In this manner the LiAlH$_4$ is subjected to only a comparatively low thermal load. In order to remove the diethyl ether completely, solvent may be after-charged and distilled off until such time as no further diethyl ether is detectable in the LiAlH$_4$ solution. A larger quantity of solvent may also be added from the outset. The distillate obtained (diethyl ether and solvent) can be reutilised after rectification.

The 20% solution obtained is colourless and virtually clear. Decomposition products of LiAlH$_4$ are undetectable or barely detectable. When THF is used as the solvent, although the 20% solution is viscous, no LiAlH$_4$ crystallises out under refrigeration (down to −20° C.), so that such a solution may be marketed commercially. A 20% solution of LiAlH$_4$ may also be diluted with a hydrocarbon such as, for example, toluene (or xylene, mesitylene, cyclopentane, cyclohexane, methyl cyclohexane, pentane, hexane, heptane, octane). The hydrocarbon can also be added already to the reaction solution of LiAlH$_4$ in diethyl ether. The hydrocarbon is not disruptive to the subsequent addition of the solvent (which exhibits the higher complexing energy with LiAlH$_4$) and the distilling-off of the diethyl ether.

The advantage of the process according to the invention resides in that LiAlH$_4$ solutions (with a solvent other than diethyl ether) can be prepared directly from the synthesis solution by solvent exchange. The isolation of the LiAlH$_4$ by thermal drying, which is unfavourable in energy terms, and the associated losses by thermal decomposition are avoided in advantageous manner.

The invention is explained hereinbelow in greater detail by reference to Examples.

EXAMPLE 1

Complexing of LiAlH$_4$ with THF, Determination of Complexing Energies 4.0 g LiAlH$_4$ powder (103 mmol) in 222.5 g toluene at 20° C. were placed in a 0.8-liter reactor under a nitrogen atmosphere. Using an RC1-model calorimeter from Mettler-Toledo, a temperature ramp from 20° C. to 25° C. was done and calibrated by means of electric calibration heating (Cp=1.94 kJ/(kg*K)), in order to determine the heat capacity of this mixture. 15.3 g diethyl ether (206 mmol) were then dispensed in at T$_{(i)}$=25° C. within 30 minutes, with 30 minutes' post-reaction. 14.9 g tetrahydrofuran (206 mmol) were then added to this solution within 30 minutes, with 30 minutes' post-reaction. A temperature ramp from 25° C. to 20° C. was done and calibrated by means of electric calibration heating (Cp=1.97 kJ/(kg*K)), in order to determine the heat capacity of the total mixture of $LiAlH_4$, toluene, diethyl ether and THF. The mathematically determined complexing energies were as follows:

for step 1 (diethyl ether complexing):
dH=−34.1 kJ/mol $LiAlH_4$
for step 2 (tetrahydrofuran complexing):
dH=−35.0 kJ/mol $LiAlH_4$.

The $LiAlH_4$ already complexed by diethyl ether released further energy (35.0 kJ/mol $LiAlH_4$) when reacted with THF.

EXAMPLE 2

Removal of Diethyl Ether by Distillation From a Solution of $LiAlH_4$ in Diethyl Ether and THF 250 g of the toluene-containing solution of $LiAlH_4$ with diethyl ether and tetrahydrofuran in a molar ratio of 1:2:2 ($LiAlH_4$:diethyl ether:THF), which was prepared in 1, were distilled in an oil bath (80° C.), initially at standard pressure (nitrogen atmosphere) and then under vacuum (up to 150 mbar). 169 g of a clear solution remained, which showed a molar ratio of diethyl ether:THF of 0.1:1. 1.7 g THF (2.3 mmol) were again added, and distillation took place again under the same conditions. Diethyl ether could no longer be detected by H-NMR spectroscopy in the solution obtained.

EXAMPLE 3

Re-Solvation of an $LiAlH_4$/Diethyl Ether Solution with THF

In a 500 ml reactor having a double-walled jacket 178 g THF (2475 mmol) were added at room temperature to 149 g of a 21% solution of $LiAlH_4$ in diethyl ether (825 mmol $LiAlH_4$+1650 mmol diethyl ether), corresponding to a ratio of $LiAlH_4$:diethyl ether:THF=1:2:3. The solution was heated to boiling under a nitrogen atmosphere (internal temperature 60° C.). When distillate had ceased to pass over at this temperature, a vacuum was applied and the pressure was reduced gradually to 50 mbar. The distillation was finished when no further distillate passed over.

After breaking the vacuum with nitrogen, 143 g of a clear solution containing 20.9 wt. % $LiAlH_4$ were obtained. Diethyl ether was no longer detectable in the H-NMR spectrum, the molar ratio of $LiAlH_4$:tetrahydrofuran was 1:2.

EXAMPLE 4

Preparation of a 15% $LiAlH_4$ Solution in THF/Toluene 48.2 g toluene were added to 123.1 g of the solution of $LiAlH_4$ in THF from Example 3 having an $LiAlH_4$ content of 677 mmol. The solution remained clear and colourless. The $LiAlH_4$ content was around 15 wt. %, the molar ratio of $LiAlH_4$:tetrahydrofuran was 1:2.

What is claimed is:

1. A process for the preparation of $LiAlH_4$ solution comprising reacting lithium hydride with an aluminium halide in diethyl ether to yield lithium aluminium hydride, removing any lithium halide which formed during the reacting, then adding a solvent the complexing energy of which with $LiAlH_4$ is greater than the complexing energy of diethyl ether with $LiAlH_4$ and removing diethyl ether by distillation to yield the $LiAlH_4$ solution.

2. The process according to claim 1, wherein said solvent is at least one ether other than diethyl ether.

3. The process according to claim 1 wherein said solvent is selected from the group consisting of tetrahydrofuran (THF), 2-methyltetrahyrofuran, and an ethyl glycol.

4. The process according to claim 1, wherein said aluminum halide is $AlCl_3$.

5. The process according to claim 1, wherein solution of $LiAlH_4$ in diethyl ether is concentrated by distilling off the diethyl ether.

6. The process according to claim 1, wherein a quantity of solvent at least equivalent (on a molar basis) to the residual diethyl ether quantity is added.

7. The process according to claim 5, wherein the diethyl ether is distilled off under vacuum at temperatures of from 40 to 80° C.

8. The process according to claim 7, wherein the distillation takes place at temperatures of from 55 to 65° C.

9. The process according to claim 1, wherein the $LiAlH_4$ solution is diluted with a hydrocarbon.

* * * * *